(12) United States Patent
Shukla et al.

(10) Patent No.: US 12,131,271 B2
(45) Date of Patent: Oct. 29, 2024

(54) MANUFACTURING CARBON EMISSION QUANTIFICATION INTERFACE

(71) Applicant: Schlumberger Technology Corporation, Sugar Land, TX (US)

(72) Inventors: Anubhav Shukla, Pune (IN); Ashutosh Kumar Gupta, Pune (IN); Laurent Alteirac, Missouri City, TX (US); Emrah Gokdag, Missouri City, TX (US); Jane O'Connor, Houston, TX (US); Manoj Mahajan, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/539,644

(22) Filed: Dec. 14, 2023

(65) Prior Publication Data
US 2024/0202614 A1    Jun. 20, 2024

Related U.S. Application Data (60) Provisional application No. 63/387,518, filed on Dec. 15, 2022.

(51) Int. Cl.
    *G06Q 10/063*      (2023.01)
    *G06Q 50/04*      (2012.01)

(52) U.S. Cl.
CPC ........... *G06Q 10/063* (2013.01); *G06Q 50/04* (2013.01)

(58) Field of Classification Search
CPC .......................................... G06Q 10/00–50/00
(Continued)

(56) References Cited

U.S. PATENT DOCUMENTS

| | | | |
|---|---|---|---|
| 9,524,463 B2 * | 12/2016 | Meinrenken | G06N 5/02 |
| 10,223,167 B2 * | 3/2019 | Kaufman | G06F 16/907 |

(Continued)

FOREIGN PATENT DOCUMENTS

| | | |
|---|---|---|
| JP | 2012-032861 A | 2/2012 |
| JP | 2022-091900 A | 6/2022 |

(Continued)

OTHER PUBLICATIONS

Karlsson, Conny. "Real-time measurement and estimation of factory CO2 emissions." (2021). (Year: 2021).*

(Continued)

*Primary Examiner* — Alan S Miller
(74) *Attorney, Agent, or Firm* — Michael Guthrie (57) ABSTRACT

A method, computer system, and computer program product are provided for a graphical user interface that presents a quantification of CO2 emissions in a manufacturing process. A selection of a material is received, and the selection is displayed in a graphic user interface. Amounts of material and energy consumed in a manufacturing process are calculated. A chemical composition of the material is decomposed into a set of constituent elements. A first quantity of CO2 emissions is estimated based on the amount of material consumed and a first CO2 emission factor based on a proportional composition of the set of constituent elements in the chemical composition. A second quantity of CO2 emissions is estimated based on the amount of energy consumed and a second CO2 emission factor based on an energy source used in the manufacturing process. Total CO2 emissions, based on both the first and second quantities, are then displayed in the graphic user interface.

20 Claims, 6 Drawing Sheets

(58) Field of Classification Search
USPC .............................................. 705/7.11–7.42
See application file for complete search history.

(56) References Cited

U.S. PATENT DOCUMENTS

| | | | | |
|---|---|---|---|---|
| 2002/0004769 A1* | 1/2002 | Ichikawa | ............... | G06Q 10/06 705/29 |
| 2002/0133302 A1* | 9/2002 | Matsui | ................... | G06Q 10/06 702/30 |
| 2007/0038388 A1* | 2/2007 | Nojima | ................. | G06Q 50/06 702/30 |
| 2009/0287520 A1* | 11/2009 | Zimmerman | ......... | G06Q 10/04 707/999.107 |
| 2010/0042453 A1* | 2/2010 | Scaramellino | ......... | G06Q 10/06 705/308 |
| 2010/0063902 A1* | 3/2010 | Constantz | .............. | G06Q 40/00 705/28 |
| 2010/0274602 A1* | 10/2010 | Kaufman | ........... | G05B 23/0254 705/7.38 |
| 2011/0178938 A1* | 7/2011 | Reich-Weiser | ........ | G06Q 10/00 705/317 |
| 2012/0166616 A1* | 6/2012 | Meehan | ................. | G06Q 50/06 709/224 |
| 2012/0271677 A1* | 10/2012 | Rhodes, III | ............ | G06Q 10/06 705/7.27 |
| 2012/0287270 A1* | 11/2012 | Arjona Antolin | ...... | G06Q 10/30 348/E7.087 |
| 2013/0179078 A1* | 7/2013 | Griffon | .................. | G06Q 50/26 702/3 |
| 2013/0191313 A1* | 7/2013 | Meinrenken | ............. | G06N 5/02 706/46 |
| 2018/0276679 A1* | 9/2018 | Fang | ....................... | G06Q 10/08 |
| 2020/0118117 A1* | 4/2020 | McManus | ............. | H04L 9/3247 |
| 2020/0372588 A1* | 11/2020 | Shi | ......................... | G06Q 50/06 |
| 2022/0207552 A1* | 6/2022 | Normand | ........... | G06Q 30/0631 |
| 2022/0358515 A1* | 11/2022 | Kahn | ...................... | G06F 30/27 |

FOREIGN PATENT DOCUMENTS

| | | |
|---|---|---|
| KR | 10-2012-0133299 A | 12/2012 |
| KR | 10-2018-0060071 A | 6/2018 |
| WO | 2014-085777 A1 | 6/2014 |

OTHER PUBLICATIONS

Ghosh, Piya, Ajay Jha, and R. R. K. Sharma. "Managing carbon footprint for a sustainable supply chain: a systematic literature review." Modern Supply Chain Research and Applications 2.3 (2020): 123-141. (Year: 2020).*

PCT International Search Report and Written Opinion; Application No. PCT/US2023/083958; Dated Apr. 16, 2024; 7 pages.

* cited by examiner

CO2 Footprint by Energy Source

| Source | % Share | Kg Co2/kWh | Weighted Emissions |
|---|---|---|---|
| Wind | 2% | 0.012 | 0.0002 |
| Bio Fuel | 9% | 0.23 | 0.02 |
| Coal | 19% | 0.82 | 0.16 |
| Natural Gas | 65% | 0.49 | 0.32 |
| Solar | 3% | 0.041 | 0.001 |
| Hydro | 2% | 0.024 | 0.0004 |
| Total kWh Consumed | | | 0.50 |

Energy Consumed per 1 Unit

| Process | Time | kWh | Energy |
|---|---|---|---|
| Coring | 0.005 | 10 | 0.05 |
| Moulding | 0.002 | 50 | 0.1 |
| Shakeout | 0.03 | 2 | 0.06 |
| Cleaning | 0.008 | 5.10 | 0.0408 |
| Finishing | 0.02 | 2 | 0.04 |
| 3-Axis Mill | 0.08 | 9.5 | 0.76 |
| Drill Press | 0.03 | 5.6 | 0.168 |
| Cyl. Grinding | 0.15 | 14.3 | 2.145 |
| Int. Grinding | 0.13 | 10.7 | 1.391 |
| Total kWh Consumed | | | 4.76 |

CO2 Emission for Material spec ASTM A536

| Mat. Spec. No. | Composition | % | CO2/Metal (kg) | Weighted |
|---|---|---|---|---|
| ASTM A536 | Fe | 93.4 | 2.2 | 2.05 |
| | Mn | 0.40 | 1.6 | 0.6 |
| | CO2 in melting (kg) | | | 1 |
| | Total CO2 for material (kg) | | | 3.05 |

| Part Rough Mass (kg) | CO2 Emission on Material Consumption (kg) | 4.15 |
|---|---|---|
| Energy Consumed | Process CO2 Emission per Part (kg) | 2.38 |

| Material CO2 Emission per Part (kg) | + | Process CO2 Emission per Part (kg) | = | Total CO2 Emission per Part (kg) |
|---|---|---|---|---|
| 4.15 | | 2.38 | | 6.53 |

| Annual CO2 Emission on QTY 17000 | 111 Tonne CO2 |
|---|---|

MANUFACTURING CARBON EMISSION QUANTIFICATION INTERFACE

CROSS-REFERENCE TO RELATED APPLICATIONS

This application is a nonprovisional application of, and thereby claims benefit to, U.S. Provisional application 63/387,518 filed on Dec. 15, 2022, which is incorporated herein by reference in its entirety.

BACKGROUND

In the realm of manufacturing, the drive towards efficiency and sustainability has become a concern. With the advent of advanced technologies, industries are continually seeking methods to optimize operations, reduce waste, and enhance productivity. This pursuit is driven to stay competitive but also by the increasing awareness of resource management and the impact on operational costs and environmental sustainability. With the increasing regulatory and societal pressures to adopt sustainable practices, manufacturers are seeking solutions that addresses environmental concerns but also align with operational efficiency and product quality.

SUMMARY

Manufacturing carbon dioxide ($CO_2$) emission quantification interface includes quantifying $CO_2$ emissions in a manufacturing process. In one embodiment, the method includes receiving a selection of a material from the graphic user interface and displaying the selection in the graphic user interface. The method also includes calculating an amount of material and an amount of energy that are consumed when manufacturing a product according to the manufacturing process. The method further includes decomposing a chemical composition of the material into a set of constituent elements. The method additionally includes estimating a first quantity of $CO_2$ emissions based on the amount of material consumed and a first $CO_2$ emission factor. The first $CO_2$ emission factor is based on a proportional composition of the set of constituent elements in the chemical composition. The method further includes estimating a second quantity of $CO_2$ emissions based on the amount of energy consumed and a second $CO_2$ emission factor. The second $CO_2$ emission factor is based on an energy source used in the manufacturing process. The method also includes displaying in the graphic user interface a total $CO_2$ emission for the product based on both the first quantity of $CO_2$ emissions and the second quantity of $CO_2$ emissions.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

In general, embodiments are directed to presenting a graphical user interface (GUI) for monitoring carbon emissions in a manufacturing environment. According to one illustrative embodiment, a method is provided for that simplifies a user interface to quantify carbon dioxide ($CO_2$) emissions in a manufacturing process. The method includes receiving a selection of a material from the graphic user interface and displaying the selection in the graphic user interface. The method also includes calculating an amount of material and an amount of energy that are consumed when manufacturing a product according to the manufacturing process. The method further includes decomposing a chemical composition of the material into a set of constituent elements. The method additionally includes estimating a first quantity of $CO_2$ emissions based on the amount of material consumed and a first $CO_2$ emission factor. The first $CO_2$ emission factor is based on a proportional composition of the set of constituent elements in the chemical composition. The method further includes estimating a second quantity of $CO_2$ emissions based on the amount of energy consumed and a second $CO_2$ emission factor. The second $CO_2$ emission factor is based on an energy source used in the manufacturing process. The method also includes displaying in the graphic user interface a total $CO_2$ emission for the product based on both the first quantity of $CO_2$ emissions and the second quantity of $CO_2$ emissions.

Figure 1:
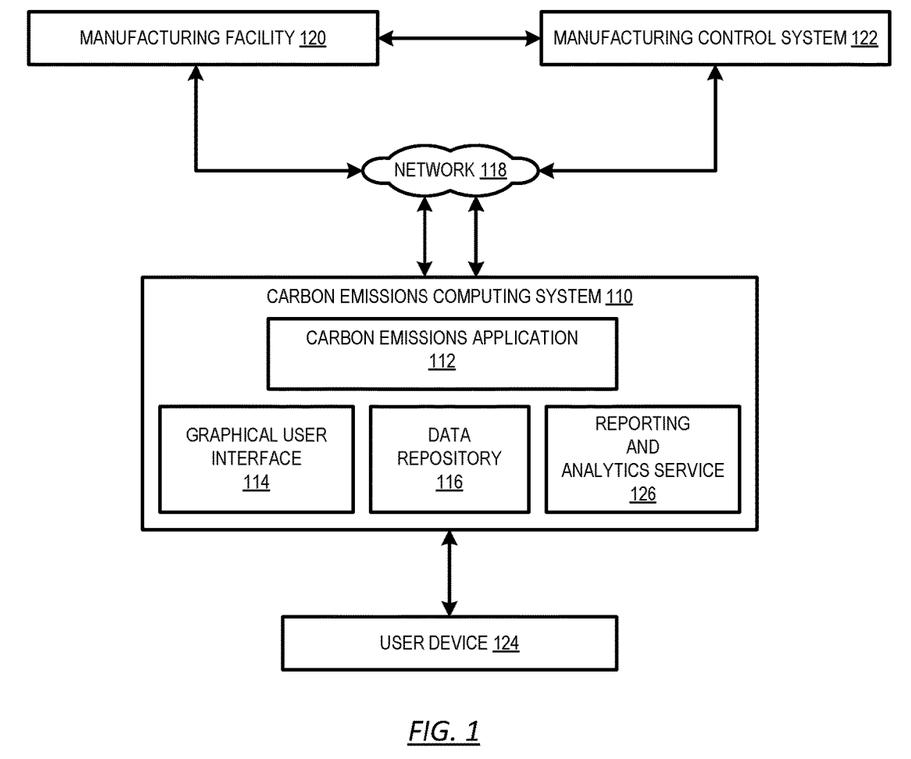
FIG. 1 shows a block diagram for a carbon emissions computing system according to illustrative embodiments.

Turning to FIG. 1, a block diagram for a carbon emissions computing system is shown according to illustrative embodiments. The system includes a carbon emissions application, which may be one or more software applications and/or hardware systems used to evaluate the carbon emissions caused by a given manufacturing process performed at the manufacturing facility. The system of FIG. 1 may be used to analyzed carbon emissions in a manufacturing environment.

The carbon emissions computing system (110) is a computer system responsible for calculating and managing the $CO_2$ emission data. In one or more embodiments, the carbon emissions computing system (110) is a computing system as shown in FIG. 10.1 and FIG. 10.2. Carbon emissions computing system (110) is configured to integrate $CO_2$ quantification into the manufacturing process. For example, carbon emissions computing system (110) may be implemented as a closed-loop system where $CO_2$ emissions are continuously monitored. In some embodiments, carbon emissions computing system (110) includes functionality to inform and adjust manufacturing processes based on monitored emissions in real-time for sustainability and efficiency improvements.

The carbon emissions application (112) is a software application that performs the calculations for $CO_2$ emissions based on various inputs and algorithms. In some embodiments, carbon emissions application (112) may use data such as material consumption, energy usage, and possibly other factors such as machine efficiency and operating conditions to quantify CO2 emissions.

The graphic user interface (114) (GUI) is an interface through which users may interact with the carbon emissions application (112). The graphic user interface (114) is configured to receive from users, input data including settings and display the results of the CO2 emissions calculations and analyses. The graphic user interface (114) may implement using one or more web technologies like HTML, CSS, and JavaScript.

Continuing with the carbon emissions computing system (110), the reporting and analytics service (126) is software designed to process and analyze the data collected by the system's other components. The reporting and analytics service (126) is configured to compile, organize, and present the data into reports that are accessible and informative for users. The reports might include statistical summaries that show trends in the data, such as an increase in emissions over time. The reports may further include visualizations. The visualizations can take the form of graphs, charts, or heat maps that provide a visual representation of the emissions across different products, materials, and/or jurisdictions.

The reporting and analytics service (126) may include or use one or more libraries for statistical analysis, data visualization, and report generation. For example, libraries may include Pandas and NumPy in Python, as well other packages such as Sklearn, Matplotlib, and or Statsmodels, to manipulate and analyze large datasets. Using the output of the libraries, the carbon emissions computing system (110) may calculate various statistical measures, such as mean, median, standard deviations, and correlations of the emissions across different products, materials, and/or jurisdictions. For data visualization, the reporting and analytics service (126) may interface with libraries such as Matplotlib or Seaborn (also in Python) to obtain a range of functions for creating a variety of charts and graphs, including line charts, bar charts, scatter plots, and heat maps. For report generation, the reporting and analytics service (126) may interface with libraries such as ReportLab or JasperReports, as well as other structured data such as csv file and/or excel tables, to design templates that can be automatically populated with data.

The data repository (116) stores data used by the carbon emissions application (112). The data repository (116) may include data such as material specifications, energy consumption records, CO2 emission factors for varied materials and processes, and historical data for analysis and comparison.

In one or more embodiments of the invention, the data repository (116) is any type of storage unit and/or device (e.g., a file system, database, data structure, or any other storage mechanism) for storing data. Further, the data repository (116) may include multiple different, potentially heterogeneous, storage units and/or devices.

User device (124) is a computer, tablet, or another device through which users may access the graphic user interface (114) of the carbon emissions computing system (110). Users may input data, receive information, and make decisions based on the data presented by the carbon emissions application (112). In one or more embodiments, the user device is a computing system as shown in FIG. 10.1 and FIG. 10.2.

Network (118) is the communication framework that connects carbon emissions computing system (110), the Manufacturing Facility (120), and the manufacturing control system (122). Network (118) enables the transfer and sharing of data between these components. The Network (118) may be based on various network technologies such as LAN, WAN, the Internet, or industrial communication protocols.

The manufacturing facility (120) is the physical location where products are manufactured. The manufacturing facility (120) may send and receive data to and from the carbon emissions computing system (110), such as real-time manufacturing data, which may be used to monitor and adjust processes to reduce CO2 emissions.

The manufacturing control system (122) is a system that controls the actual manufacturing processes within the manufacturing facility (120). The manufacturing control system (122) may receive commands or parameters from the carbon emissions computing system (110) to adjust manufacturing processes in order to minimize CO2 emissions. The manufacturing process adjustments may include modifying operation parameters, switching to alternative materials or processes, or even halting processes if the emissions exceed certain thresholds.

Figure 2:
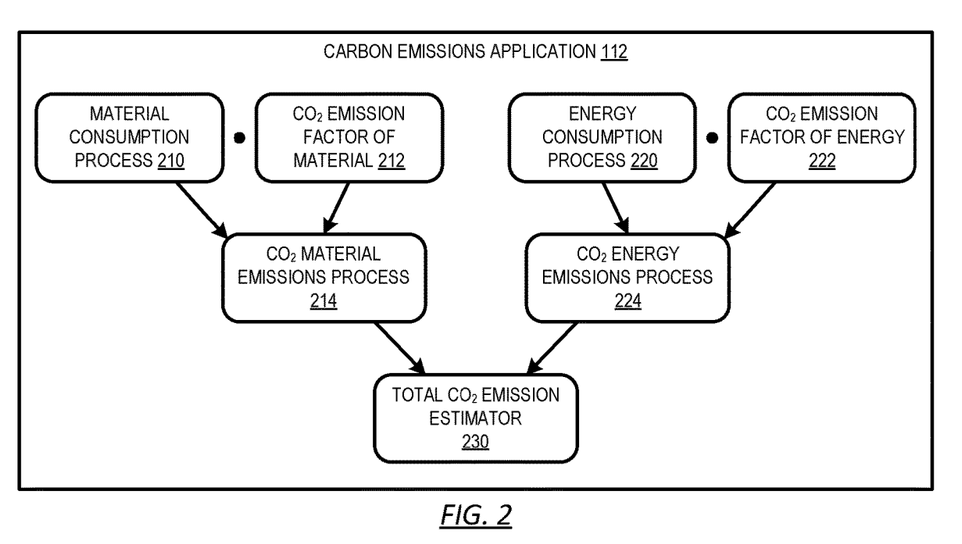
FIG. 2 shows a flowchart of processing steps within a carbon emissions application according to illustrative embodiments.

Turning to FIG. 2, a flowchart of processing steps within a carbon emissions application is shown according to illustrative embodiments. As depicted, FIG. 2 outlines various processing step within the carbon emissions application (112) of FIG. 1 for calculating the total CO2 emissions of a manufacturing process by separately accounting for the emissions from materials and energy consumption. Based on the illustrated process, the carbon emissions application (112) may provide data on CO2 emissions, enabling manufacturers to make informed decisions to reduce a carbon footprint.

The material consumption process (210) is a processing step where data about the materials used in the manufacturing process is gathered. This process involves calculating the amount of each material used in the manufacturing of a product. For example, the calculation might be performed by a dedicated computational module within the server's software architecture, which could use data provided by the user or fetched from integrated systems, like emissions reduction plan (ERP) or manufacturing execution systems (MES), via application programming interfaces (APIs).

In some embodiments, the material consumption process (210) may involve a manual estimation of material utilization. In manual estimation, users may manually input estimated material usage data into the system. The graphic user interface (114) of FIG. 1 presents a form or other interface whereby users may enter estimates. In this example, graphic user interface (114) might include text fields, dropdown menus, or sliders for inputting quantities and types of materials used.

On the backend, the carbon emissions computing system (110) receives the manual input data from the material consumption process (210). Carbon emissions computing system (110) of FIG. 1 processes the data, potentially performing validations to ensure that the data falls within expected ranges or conforms to certain formats. The data may then be stored in data repository (116) of FIG. 1 for later retrieval and processing.

In some embodiments, the material consumption process (210) may involve actual material utilization on a manufacturing shop floor. In this scenario, the carbon emissions computing system (110) gathers data directly through an integration with integration of things (IOT) devices or sensors that track material usage in real-time. The data may include weights, volumes, or counts of materials used, gathered by sensors and radio frequency identifier (RFID) tags, and transmitted back to the carbon emissions computing system (110) using protocols like message queuing telemetry transport (MQTT) or hypertext transfer protocol (HTTP) protocols.

In this example, the carbon emissions computing system (110) backend system may process and analyze the sensor data in real-time using data streaming and processing technologies like Kafka® technology or Amazon Kinesis® technology to manage potentially large volumes of incoming data. Kafka is a registered trademark of the Apache Software Foundation. Kinesis is a registered trademark of Amazon.

In some embodiments, the material consumption process (210) may involve analysis from a manufacturing simulation software. Using the analysis from a manufacturing simulation software, the system integrates with manufacturing simulation software to obtain material consumption data. The simulation software might provide detailed data on expected material usage for different manufacturing scenarios or processes.

In this example, the material consumption process (210) may integrate with the manufacturing simulation software using one or more Application Programming Interfaces (API) or data export/import functionalities using file-based data exchanges, like comma separated value (CSV) or Javascript Object Notation (JSON) files. For example, custom scripts or ETL (Extract, Transform, Load) processes may retrieve data from the simulation software and format the data for use within the carbon emissions application (112). The carbon emissions computing system (110) may then process this data, which could include parsing, data transformation, and integration into the overall material consumption analysis.

$CO_2$ emission factor of material (212) is a processing step that involves determining the $CO_2$ emission factor for each material used in the manufacturing process. The emission factor is based on the chemical composition of the material and the environmental impact of producing or processing that material.

$CO_2$ emission factor of material (212) may involve decomposing a chemical composition of the material to understand the proportion of each constituent element of the selected material. Decomposing chemical composition may employ scientific computing libraries, such as NumPy or Pandas in Python, to manage and analyze the compositional data. This decomposition may leverage a materials database containing profiles for various materials. The profiles may be calculated based on industry standards stored in data repository (116) of FIG. 1, and/or sourced from third-party environmental databases or scientific datasets, such as those provided by the Intergovernmental Panel on Climate Change (IPCC) or industry-specific lifecycle assessment (LCA) databases.

For an alloy material, the $CO_2$ emission factor of material (212) may involves identifying the alloy's composition, possibly querying a materials database that includes detailed information on various alloys and alloy compositions. Once the composition is obtained, the $CO_2$ emission factor of material (212) calculates the $CO_2$ emission factor for the alloy, weighting an emission factor of each constituent element by the proportion of the element in the alloy to arrive at an overall emission factor for the alloy itself. Computational libraries such as NumPy for Python could be used to manage the numerical operations for this calculation, using cloud computing resources from providers, like Amazon Web Service (AWS) or Microsoft Azure® for scalability and reliability.

$CO_2$ material emissions process (214) is a processing step that calculates the $CO_2$ emissions associated with the materials consumed in the manufacturing process by using the data from material consumption process (210) and $CO_2$ emission factor of material (212). For each material, this processing step combines the amount of material used, determined by material consumption process (210), with the emission factor determined by $CO_2$ emission factor of material (212).

Energy consumption process (220) is a processing step that measures the amount of energy consumed during the manufacturing process. The process involves tracking the energy usage of machinery and other equipment involved in the production.

Energy consumption process (220) provides an estimation of a second quantity of $CO_2$ emissions based on the amount of energy consumed. The carbon emissions application (112) estimates the emissions from energy consumption by considering quantity of energy used, which in some embodiments may be monitored and reported by the manufacturing control system (122) of FIG. 1.

$CO_2$ emission factor of energy (222) is a processing step that determines the $CO_2$ emission factor for the energy consumed. The energy source's $CO_2$ emission factor may be pre-defined in the system based on the type of energy (e.g., coal, gas, renewable) used in the manufacturing facility (120). The energy source's $CO_2$ emission factor may vary depending on the source of the energy, such as whether from fossil fuels, renewable sources, or a mix. $CO_2$ emission factor of energy may integrate with energy monitoring systems to get accurate consumption data and might use conversion protocols and emission factors based on standards set by environmental agencies or industry bodies.

In some embodiments, $CO_2$ emission factor of energy (222) may consider one or more different jurisdictions in which manufacturing may be performed. Each jurisdiction, or geographic regions, might have a distinct mix of energy sources (e.g., coal, natural gas, renewables), which have different $CO_2$ emissions profiles. In this example, $CO_2$ emission factor of energy (222) may access a database, such as in data repository (116) of FIG. 1, which may contain region-specific energy consumption data and corresponding $CO_2$ emissions factors. The database could be a cloud-hosted relational database, which may be regularly updated with the latest emissions data.

In an embodiment, carbon emissions application (112) analyzes $CO_2$ emissions from energy consumption across different or jurisdictions. For example, upon receiving a request, carbon emissions application (112) of FIG. 1 may retrieve relevant data and execute a comparative analysis algorithm to calculate the $CO_2$ emissions for each energy source used in the different jurisdictions. Calculating the $CO_2$ emissions for each energy source used in the different jurisdictions may involve techniques for data normalization and aggregation, using one or more libraries such as Pandas (Python).

Once the system has calculated the $CO_2$ emissions associated with the manufacturing process in each jurisdiction, the user may select the jurisdiction that offers the lowest $CO_2$ emissions for the process. The selection of the jurisdiction may be made through the graphic user interface (114), which may present the data in a comparative chart or table format using visualization libraries like D3.js or Plotly to render interactive charts.

In some embodiments, the user's selection may be captured as a stateful interactions with the graphic user interface (114) using session management in a web application framework like Spring Boot (Java) or Flask (Python). The selection is then sent to the carbon emissions application (112), where the selection is logged and could influence subsequent processing. For example, the manufacturing control system (122) may adjust one or more process parameters to align with the chosen jurisdiction's energy profile. This may have the backend system to be capable of handling, which could be managed.

CO2 energy emissions process (224) is a processing step that combines the emissions data estimated by energy consumption process (220) with emission factors determined by the CO2 emission factor of energy (222) to calculate the CO2 emissions resulting from the energy consumed during the manufacturing process. The carbon emissions application (112) estimates the emissions from energy consumption by considering quantity of energy used, which in some embodiments may be monitored and reported by the manufacturing control system (122).

Total CO2 Emission Estimator (230) is a processing step that combines the CO2 emissions from both the CO2 material emissions process (214) and CO2 energy emissions process (224) to estimate the total CO2 emissions for the manufacturing process.

While FIGS. 1-2 show a configuration of components, other configurations may be used without departing from the scope of the invention. For example, various components may be combined to create a single component. As another example, the functionality performed by a single component may be performed by two or more components.

Figure 3:
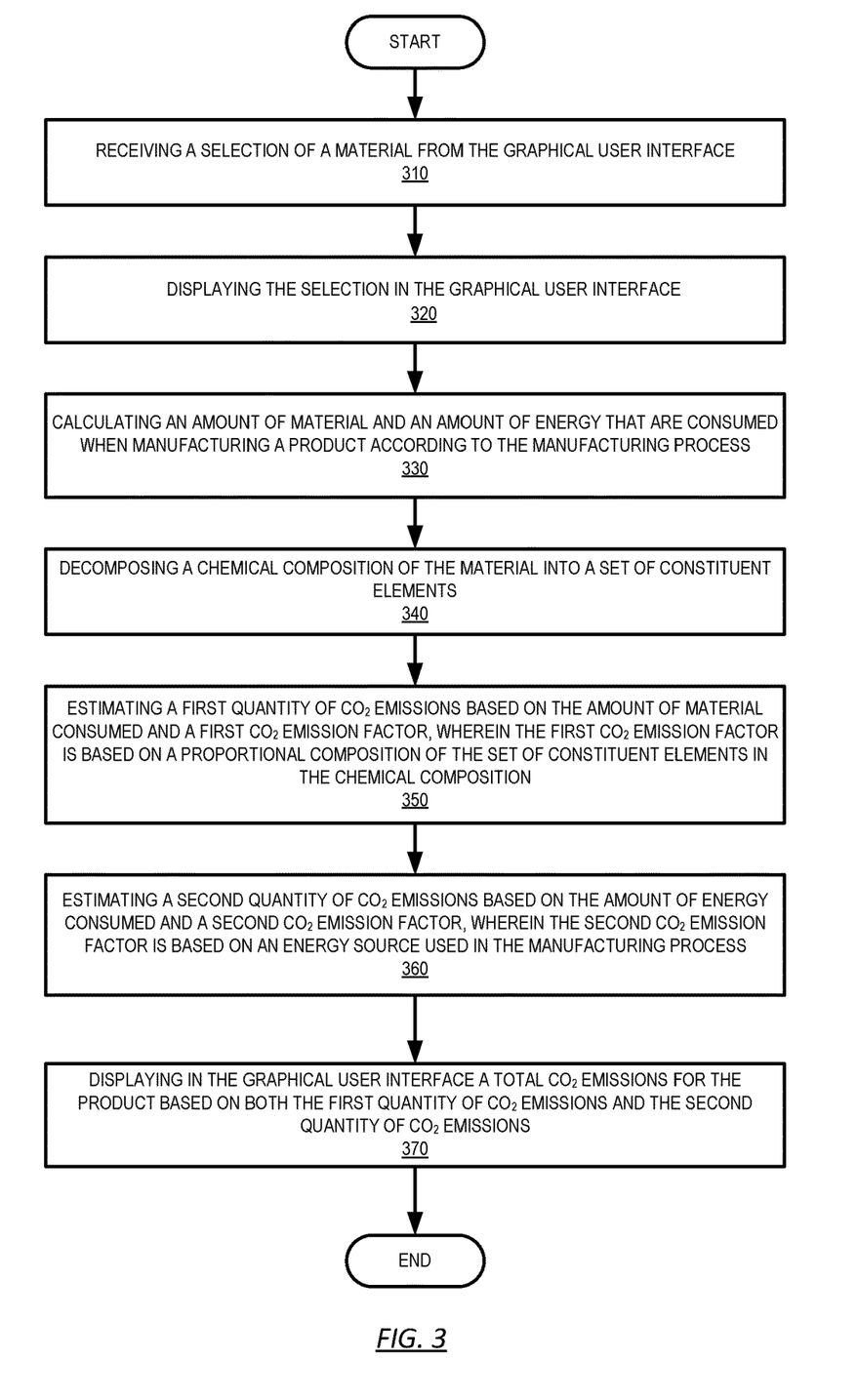
FIG. 3 shows a flowchart for quantifying carbon emissions in a manufacturing process according to illustrative embodiments.

Turning to FIG. 3, a flowchart for quantifying CO2 emissions in a manufacturing process is shown according to one or more embodiments of the invention. the method illustrated in FIG. 3 may be performed using one or more components of the carbon emissions computing system of FIGS. 1-2.

While the various steps in this flowchart are presented and described sequentially, at least some of the steps may be executed in different orders, may be combined or omitted, and at least some of the steps may be executed in parallel. Furthermore, the steps may be performed actively or passively.

At block 310, the process receives a selection of a material from the graphic user interface. The graphic user interface may be graphic user interface of FIG. 1. The graphic user interface is part of the carbon emissions computing system, which presents the user with options for material selection. A user interacts with the graphic user interface to select a material for use in the manufacturing process, with the user's selection being facilitated by the graphic user interface.

At block 320, the selection is displayed in the graphic user interface. Once a selection is made, the graphic user interface confirms and displays the chosen material. The feedback loop ensures that the user may verify that the correct material is selected and that any adjustments may be made before proceeding.

At block 330, the process calculates an amount of material and an amount of energy that are consumed when manufacturing a product according to the manufacturing process. The calculation may be based on the material and energy consumption data from the manufacturing facility and the manufacturing control system regarding the specific manufacturing process. The consumption data might be transmitted over the network to the carbon emissions computing system for processing.

At block 340, a chemical composition of the material is decomposed into a set of constituent elements. The application breaks down the chemical composition of the selected material utilizing information on various materials, which may be stored in the data repository. The decomposition enables the application to recognize the proportion of each constituent element for accurate calculation of the CO2 emission factor, as described below.

At block 350, a first quantity of CO2 emissions is estimated based on the amount of material consumed and a first CO2 emission factor. The estimation takes into account the amounts and types of materials used, as well as emission factors of the materials, which may be sourced from third-party databases or calculated based on industry standards.

At block 360, a second quantity of CO2 emissions is estimated based on the amount of energy consumed and a second CO2 emission factor. The second quantity of CO2 emissions is estimated from energy consumption by considering the type and quantity of energy used, which may be monitored and reported by the manufacturing control system. In some embodiments, energy source's CO2 emission factor may be pre-defined in the system based on the type of energy (e.g., coal, gas, renewable) used in the manufacturing facility.

At block 370, total CO2 emissions for the product is displayed in the graphic user interface. The total CO2 emissions displayed in the graphic user interface combines CO2 emissions from both material and energy consumption. The total CO2 emissions may be presented in a format, such as graphs or charts, which are generated by the carbon emissions application based on the calculations performed.

The following example is for explanatory purposes and not intended to limit the scope of the invention.

Figure 4:
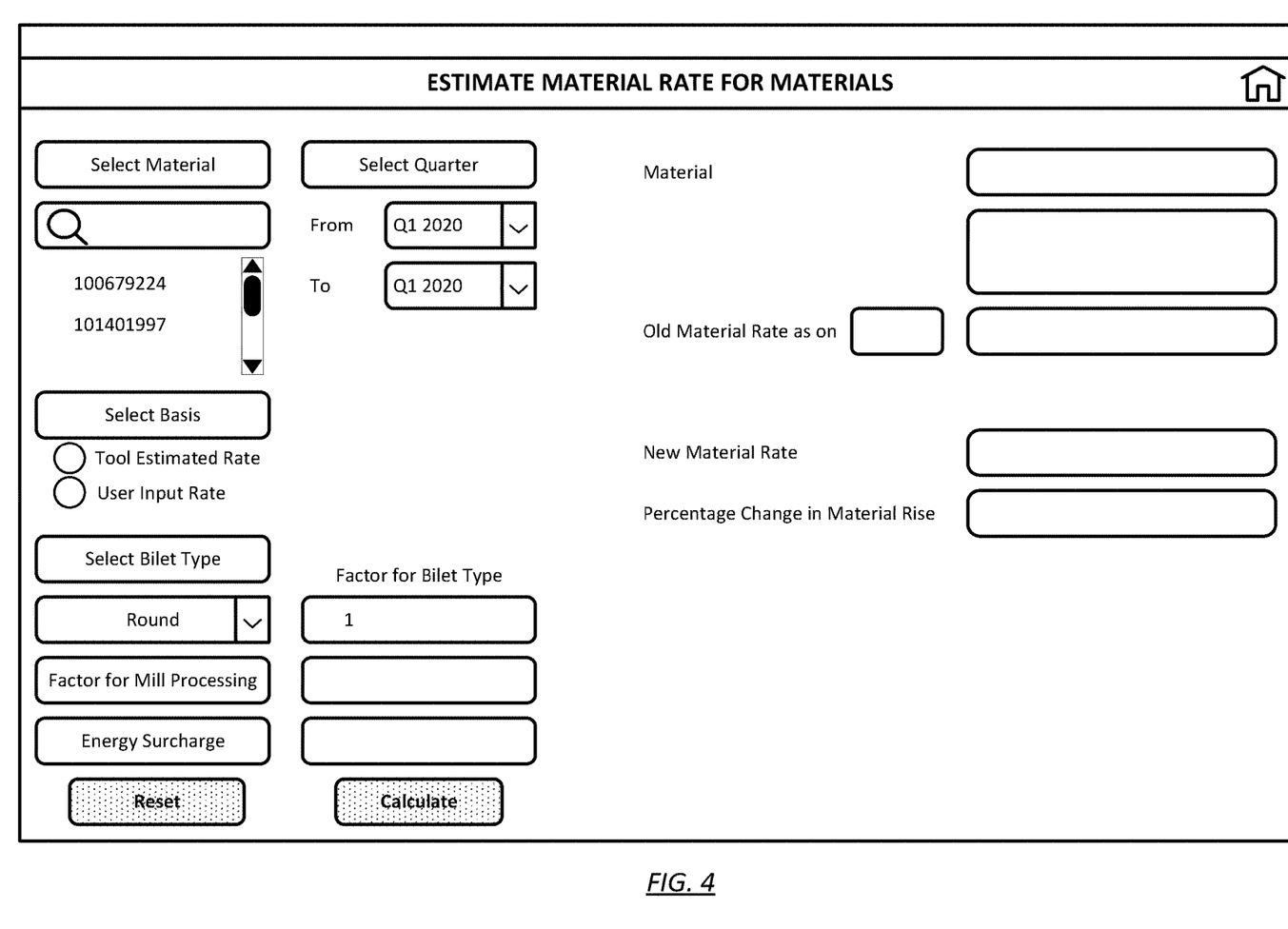
FIG. 4 shows a graphic user interface according to illustrative embodiments.

Turning to FIG. 4, a graphic user interface is shown according to illustrative embodiments. The graphic user interface is one example of graphic user interface of FIG. 1.

This graphic user interface is part of the carbon emissions application (112) of FIG. 1, which integrates various data points to provide a comprehensive estimation of CO2 emissions. Each input field and selection option feeds into the carbon emissions calculating algorithms, resulting in an estimation of the total CO2 emissions for the product being manufactured. The graphic user interface serves as the interactive component where users may provide specific data and receive feedback in the form of calculated emissions data.

The graphic user interface (400) includes multiple graphic user interface elements, also known as a widget or control. Each graphic user interface element is an interactive component that facilitates user interaction with the carbon emissions application (112) of FIG. 1. These elements include buttons, text boxes, sliders, drop-down lists, and more, each serving a specific function. For instance, a button may be clicked to initiate an action, a text box allows for data entry, and a slider may adjust a setting within a defined range. Graphic user interface elements are designed to be intuitive and easy to use, often accompanied by icons or labels that clearly indicate the intended purpose.

The "Select Material" element is a dropdown menu that allows the user to select the material that will be used in the manufacturing process. This element may facilitate the selection of one or more materials from the graphic user interface as part of the CO2 emissions estimation process.

The "Select Quarter" element allows the user to specify the period for which the material rate estimation is desired. A specified period may be relevant for calculating cost and potentially the CO2 emissions associated with material price fluctuations over time.

The "Material," "Old Material Rate as on," "New Material Rate," and "Percentage Change in Material Rate" are fields related to tracking changes in material costs. These fields may indirectly affect CO2 emission calculations since varied materials or changes in material use may result from cost variations.

The "Select Basis for Estimation" element is allowing a user may choose between an estimated average or a specific user-inputted rate for the material. This basis may impact calculating the amount of material consumed, with the CO2 emissions factor differing according to the selected basis.

The "Select Billet Type" and "Factor for Billet Type" elements allows a user to select different forms of starting materials. These elements may influence the CO2 emissions factor for the material, as different forms of material may use different amounts of energy to produce.

The "Factor for Mill Processing" element is an input field that allows the user to enter a factor that accounts for the specific processing of the mill. Values for this element may impact estimations of the CO2 emissions from energy consumption in the mill processing stage.

The "Energy Surcharge" element is a field that accounts for additional costs associated with energy consumption. These surcharges might include energy cost surcharges due to peak demand or other factors, thus affecting the total CO2 emissions estimation.

The "Calculate" element is a button that triggers the calculation process after relevant data is submitted, which could encompass both the material and energy consumption CO2 emissions estimations. The "Reset" element allows the user to clear the fields and to start a new estimation process, ensuring that previous data does not influence the new calculations.

This graphic user interface is part of the carbon emissions application (112) of FIG. 1, which integrates various data points to provide a comprehensive estimation of CO2 emissions. Each input field and selection option feeds into the carbon emissions calculating algorithms, resulting in an estimation of the total CO2 emissions for the product being manufactured. The graphic user interface serves as the interactive component where users may provide specific data and receive feedback in the form of calculated emissions data.

Figure 5:
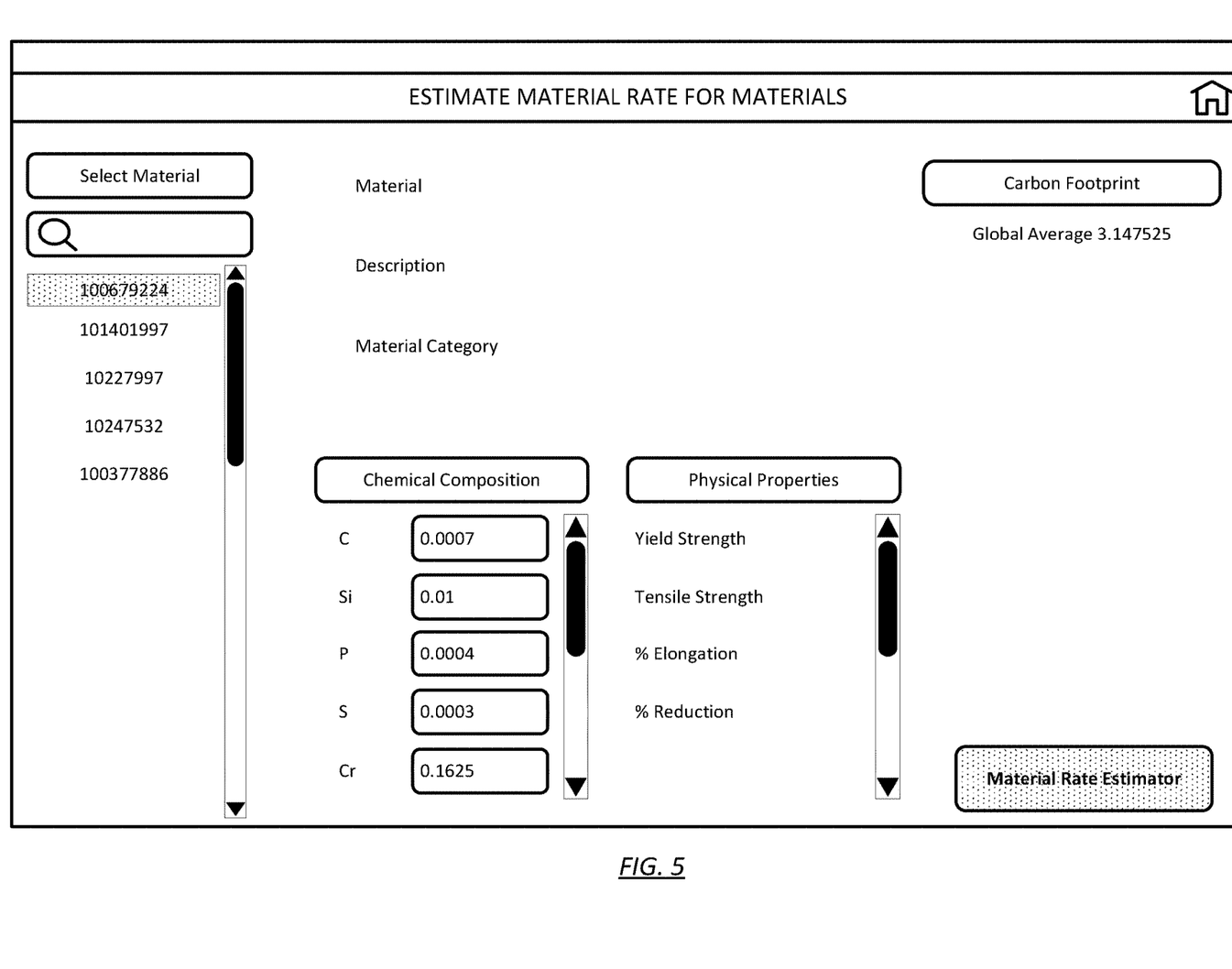
FIG. 5 shows a graphic user interface according to illustrative embodiments.

Turning to FIG. 5, a graphic user interface is shown according to illustrative embodiments. The graphic user interface is one example of graphic user interface (114) of FIG. 1. Specifically, FIG. 5 illustrates a second page of the graphic user interface illustrated in FIG. 4 and provides additional details on the carbon emission footprint related to specific materials.

The "Select Material" element is a search bar and dropdown list that allows users to select a material for which they want to estimate the carbon emissions. The selected material is displayed in the "Material" field, followed by a description that includes material standards and properties. This level of detail supports the decomposition of the material's chemical composition, which is used for calculating the carbon emission factor.

The "Material Category" field specifies the type of material that has been selected, in this case, "Stainless Steel." The "Chemical Composition" element is a table that lists the percentage composition of various elements within the selected material, such as carbon (C), silicon (Si), phosphorus (P), sulfur (S), and chromium (Cr).

The "Physical Properties" section lists physical properties of the material, such as yield strength, tensile strength, and percent elongation. These properties may be used to assess the material's performance and suitability for the manufacturing process and end use of the manufactured part.

The "Carbon Footprint" element shows the carbon footprint of the selected material expressed as kilograms of CO2 per kilogram of material. As displayed, the value "3.147525" is a global average, serving as a reference value for the carbon emissions calculation related to the selected material.

This graphic user interface of FIGS. 4-5 is part of the carbon emissions application (112) and is tailored to collect and display specific data relevant to the calculation of carbon emissions based on the material composition and consumption in the manufacturing process. The graphic user interface provides users with the detailed information to estimate the carbon emissions associated with the manufacturing of a product, in alignment with the steps and components described earlier in the system diagrams and method descriptions.

Figure 6:
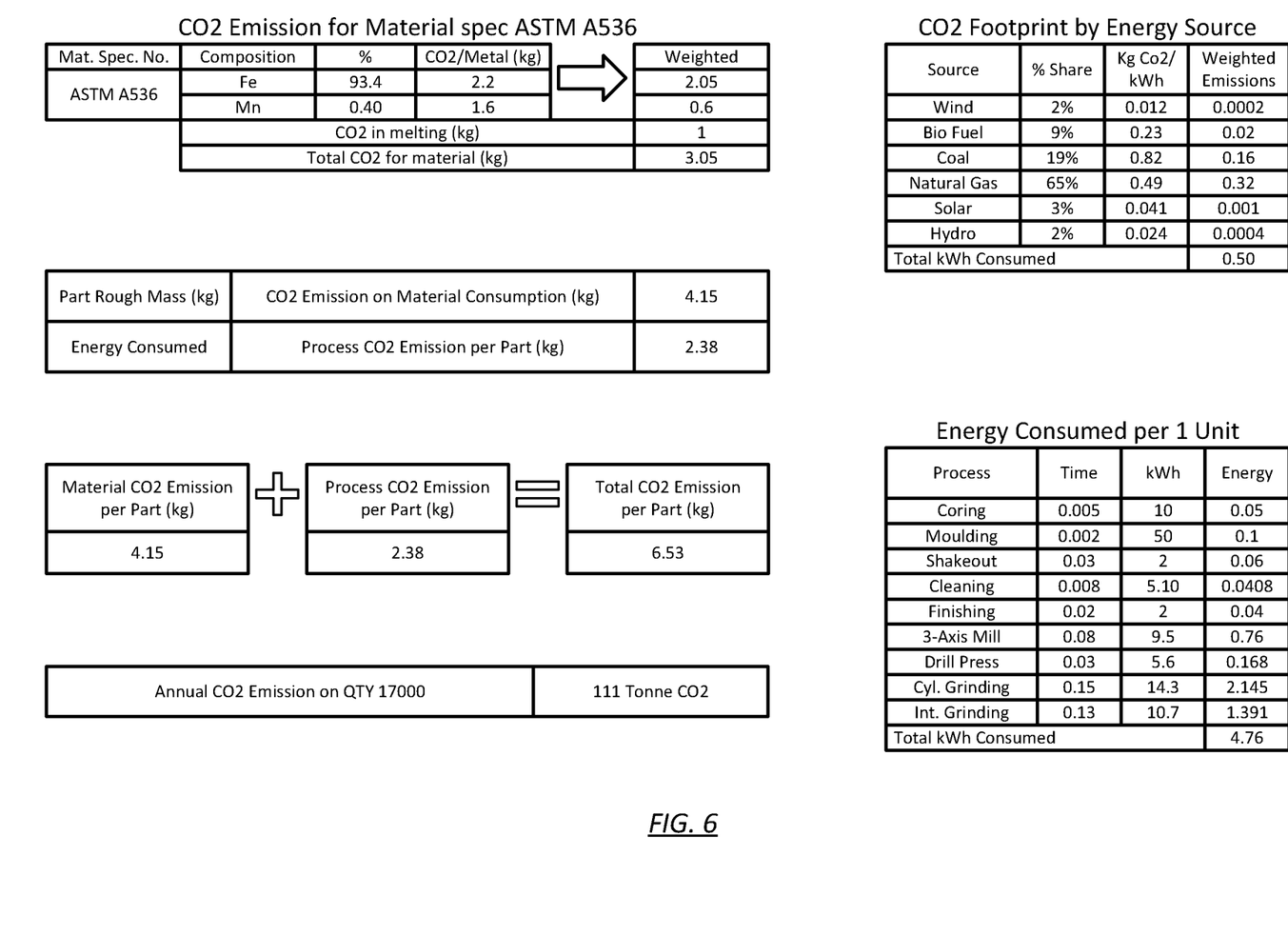
FIG. 6 shows an example of a carbon emissions application supporting engineering teams according to illustrative embodiments.

Turning to FIG. 6, a CO2 emissions report is shown according to illustrative embodiments. The report may be generated by carbon emissions application (112) and displayed on graphic user interface (114), both of carbon emissions computing system (110), illustrated in FIG. 1.

The report shown in of FIG. 6 showcases a CO2 emissions report. This report can be generated by the reporting and analytics service (126) of the carbon emissions application (112), and exhibited on the graphical user interface (114). Alternatively, it may be integrated into the data repository (116) or functioning as a distinct module, such as the reporting and analytics service (126) of within the carbon emissions computing system (110).

The detailed CO2 emissions report, featured in the report, offers comprehensive insights into the emissions associated with a specific part manufactured within a chosen jurisdiction. The breakdown of CO2 emissions is meticulously presented, delineating the contributions based on material specifications and energy sources.

The report shown in of FIG. 6 provides a detailed CO2 emissions report for a specific part manufactured in a selected jurisdiction. The report breaks down the CO2 emissions based on material specification and energy source. In this particular example, the part is an ESP pump shipping cap made in Thailand by casting and machining process.

The "CO2 Emission for Material spec ASTM A536" section details the CO2 emissions associated with the materials used to manufacture part no. ASTM A536, specifically a type of iron alloy as per the ASTM A536 specification. The section includes a percentage composition of iron and manganese, respective CO2 emissions per kilogram of each material, the weighted CO2 emission value based on the material composition, and the total CO2 emissions for the material specification.

The "CO2 footprint based on energy source" table provides an analysis of the CO2 emissions based on different energy sources used in the manufacturing process. The table shows the energy mix (e.g., wind, biofuel, coal, natural gas, solar, hydro) used in the manufacturing facility, which may be based on the jurisdiction in which the facility is located. The table also shows a percentage share of each energy source, CO2 emissions per kilowatt-hour for each source, and a weighted CO2 emissions considering the energy mix.

The "Energy Consumed per 1 unit" table breaks down calculations of the total energy consumed in kilowatt-hours for manufacturing one unit of the part. The table details specific manufacturing processes (e.g., coring, moulding, shaking out, cleaning, etc.), the time taken for each process, the energy consumption for each process. The individual processes may be combined to yield a total energy consumption figure.

The "Material level CO2 Emission Per Part" shows the calculated CO2 emissions for the material used to make one part. In the described system, this value is relevant to CO2 material emissions process (214) of FIG. 2 and block (350) of FIG. 3, where the emissions from material usage are estimated.

The "Process level CO2 Emission Per Part" reflects the CO2 emissions from the energy consumed during the manufacturing process for one part. In the described system, this value is relevant to CO2 energy emissions process (224) of FIG. 2 and block (360) of FIG. 3.

The "Total CO2 Emission Per Part" provides a summation of both material level and process level CO2 emissions. In the described system, this value corresponds to block (370) of FIG. 3, where the total CO2 emissions are displayed. The "Annual CO2 EMISSION ON QTY 17000" extends the per-part CO2 emission calculation to an annual quantity, reflecting the total expected production output, and showing the scale of impact the manufacturing of this part has on CO2 emissions annually.

The report illustrated in FIG. 6 illustrates one example of how the described carbon emissions application supports engineering teams in understanding the CO2 emission footprint associated with distinct stages of product design, manufacturing processes, and location-specific factors such as the local energy mix. The report provides a comprehensive view of the environmental impact of manufacturing a single part, allowing for targeted efforts to reduce emissions.

Figure 7A:
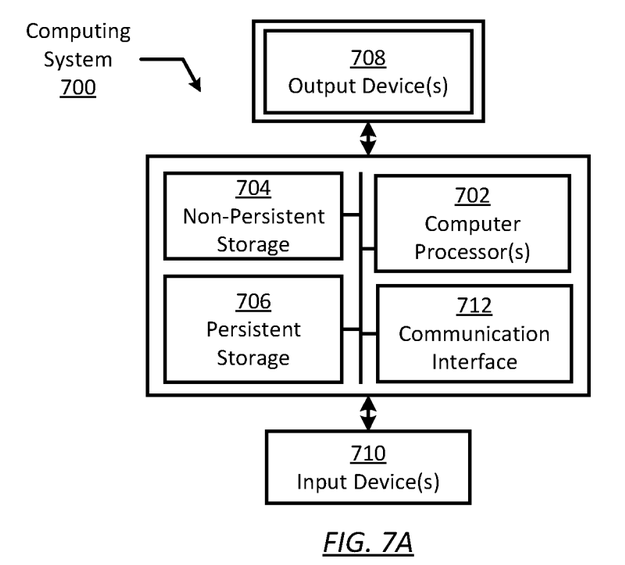
FIG. 7A shows a computing system in accordance with one or more embodiments of the invention.

Embodiments may be implemented on a computing system specifically designed to achieve an improved technological result. When implemented in a computing system, the features and elements of the disclosure provide a technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 7A, the computing system (700) may include one or more computer processors (702), non-persistent storage (704), persistent storage (706), a communication interface (708) (e.g., Bluetooth interface, infrared interface, network interface, optical interface, etc.), and numerous other elements and functionalities that implement the features and elements of the disclosure. The computer processor(s) (702) may be an integrated circuit for processing instructions. The computer processor(s) may be one or more cores or micro-cores of a processor. The computer processor(s) (702) includes one or more processors. The one or more processors may include a central processing unit (CPU), a graphics processing unit (GPU), a tensor processing unit (TPU), combinations thereof, etc.

The input devices (710) may include a touchscreen, keyboard, mouse, microphone, touchpad, electronic pen, or any other type of input device. The input devices (710) may receive inputs from a user that are responsive to data and messages presented by the output devices (712). The inputs may include text input, audio input, video input, etc., which may be processed and transmitted by the computing system (700) in accordance with the disclosure. The communication interface (708) may include an integrated circuit for connecting the computing system (7007) to a network (not shown) (e.g., a local area network (LAN), a wide area network (WAN) such as the Internet, mobile network, or any other type of network) and/or to another device, such as another computing device.

Further, the output devices (712) may include a display device, a printer, external storage, or any other output device. One or more of the output devices may be the same or different from the input device(s). The input and output device(s) may be locally or remotely connected to the computer processor(s) (702). Many diverse types of computing systems exist, and the aforementioned input and output device(s) may take other forms. The output devices (712) may display data and messages that are transmitted and received by the computing system (700). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 7B:
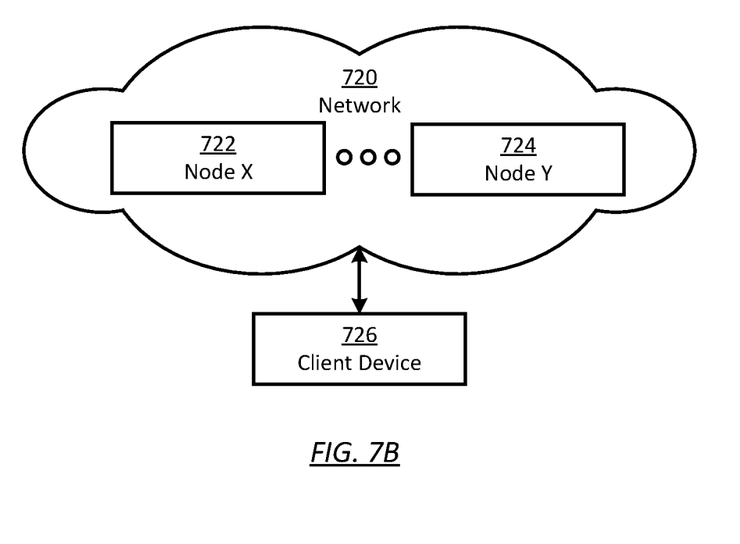
FIG. 7B shows a computing system in accordance with one or more embodiments of the invention.

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7.1, or a group of nodes combined may correspond to the computing system shown in FIG. 7.1. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (700) may be located at a remote location and connected to the other elements over a network.

The nodes (e.g., node X (722), node Y (724)) in the network (720) may be configured to provide services for a client device (726), including receiving requests and transmitting responses to the client device (726). For example, the nodes may be part of a cloud computing system. The client device (726) may be a computing system, such as the computing system shown in FIG. 7A. Further, the client device (726) may include and/or perform at least a portion of one or more embodiments.

The computing system of FIG. 7A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a graphic user interface that displays information on a display device. The graphic user interface may include various graphic user interface widgets that organize what data is shown as well as how data is presented to a user. Furthermore, the graphic user interface may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above may be devised which do not depart from the scope of the claims as disclosed herein. Accordingly, the scope should be limited by the attached claims.

What is claimed is:

1. A method for quantifying carbon dioxide ($CO_2$) emissions in a manufacturing process, comprising:
    displaying, on a graphic user interface, an interactive element that facilitates user interaction with an application for determining $CO_2$ emissions in a manufacturing process, wherein the interactive element is directed to a specific function in the application;
    receiving a selection of a material from the interactive element of the graphic user interface;
    displaying the selection in the graphic user interface;
    calculating, by the application, an amount of material and an amount of energy that are consumed when manufacturing a product according to the manufacturing process;
    decomposing, by the application, a chemical composition of the material into a set of constituent elements;
    estimating, by the application, a first quantity of $CO_2$ emissions based on the amount of material consumed and a first $CO_2$ emission factor, wherein the first $CO_2$ emission factor is based on a proportional composition of the set of constituent elements in the chemical composition;
    estimating, by the application, a second quantity of $CO_2$ emissions based on the amount of energy consumed and a second $CO_2$ emission factor, wherein the second $CO_2$ emission factor is based on an energy source used in the manufacturing process;
    displaying in the graphic user interface, together with the material, a total $CO_2$ emission for the product based on both the first quantity of $CO_2$ emissions and the second quantity of $CO_2$ emissions;
    displaying, after displaying the selection of the material and further based on the selection of the material, an additional interactive element that is directed to a second specific function in the application, wherein the second specific function is based on the material;
    receiving a second selection from the additional interactive element; and
    updating the graphical user interface based on the second selection from the additional interactive element.

2. The method of claim 1, wherein the material is an alloy, and
    wherein the estimating the first quantity of $CO_2$ emissions further comprises:
        determining the first $CO_2$ emission factor for the alloy at a material level based on a second proportional composition of each constituent element in the alloy.

3. The method of claim 1, further comprising:
    displaying a comparison of energy consumption across a set of manufacturing processes for manufacturing the product; and
    receiving a second selection of the manufacturing process from the set of manufacturing processes displayed in the graphic user interface to minimize the second quantity of $CO_2$ emissions.

4. The method of claim 1, wherein estimating the second quantity of $CO_2$ emissions further comprises:
    determining the second quantity of $CO_2$ emissions by comparing $CO_2$ emissions for the manufacturing process across a set of jurisdictions; and
    receiving a second selection via the graphic user interface of a jurisdiction from the set of jurisdictions to minimize the second quantity of $CO_2$ emissions.

5. The method of claim 1, further comprising:
    displaying a plurality of properties of the material in the graphic user interface; and
    receiving a second selection of the material based on product suitability of the plurality of properties.

6. The method of claim 1, wherein the amount of material consumed is determined through one or more of:
    manual estimation of material utilization;
    actual material utilization on a manufacturing shop floor; and
    analysis from manufacturing simulation software.

7. The method of claim 6, further comprising:
    receiving manual input of estimated material usage data via the graphic user interface, wherein the manual estimation of material utilization is incorporated into estimating the first quantity of $CO_2$ emissions.

8. The method of claim 6, further comprising:
    tracking material usage in real-time via a set of devices and sensors integrated on the manufacturing shop floor; and
    generating data on material usage, wherein the data is utilized in estimating the first quantity of $CO_2$ emissions.

9. The method of claim 6, wherein the estimating of the first quantity of $CO_2$ emissions is further comprises:
    generating, by the manufacturing simulation software, data on material usage that is expected across different manufacturing processes.

10. The method of claim 1, wherein decomposing the chemical composition of the material further comprises:
    identifying the material from a materials database; and calculating a proportional amount of each constituent element in the material.

11. The method of claim 10, wherein the proportional amount is calculated based on a weight percent of each constituent element in the material.

12. The method of claim 1, wherein updating the graphical user interface based on the second selection from the additional interactive element further comprises:
reperforming calculating, decomposing, estimating the first quantity, and estimating the second quantity, taking into account the second selection, to generate an updated quantity; and
wherein displaying the total $CO_2$ emission further comprises displaying, in the graphic user interface, the updated quantity.

13. A system comprising:
a computer processor; and
a non-transitory computer readable storage medium storing program code, which when executed by the computer processor, performs a plurality of operations comprising:
displaying, on a graphic user interface, an interactive element that facilitates user interaction with an application for determining $CO_2$ emissions in a manufacturing process, wherein the interactive element is directed to a specific function in the application;
receiving a selection of a material from the interactive element of the graphic user interface;
displaying the selection in the graphic user interface;
calculating, by the application, an amount of material and an amount of energy that are consumed when manufacturing a product according to the manufacturing process;
decomposing, by the application, a chemical composition of the material into a set of constituent elements;
estimating, by the application, a first quantity of $CO_2$ emissions based on the amount of material consumed and a first $CO_2$ emission factor, wherein the first $CO_2$ emission factor is based on a proportional composition of the set of constituent elements in the chemical composition;
estimating, by the application, a second quantity of $CO_2$ emissions based on the amount of energy consumed and a second $CO_2$ emission factor, wherein the second $CO_2$ emission factor is based on an energy source used in the manufacturing process;
displaying in the graphic user interface, together with the material, a total $CO_2$ emission for the product based on both the first quantity of $CO_2$ emissions and the second quantity of $CO_2$ emissions;
displaying, after displaying the selection of the material and further based on the selection of the material, an additional interactive element that is directed to a second specific function in the application, wherein the second specific function is based on the material;
receiving a second selection from the additional interactive element; and
updating the graphical user interface based on the second selection from the additional interactive element.

14. The system of claim 13, wherein the operations further comprise:
receiving a second selection of a plurality of materials from the graphic user interface;
displaying a comparison of $CO_2$ emissions across the plurality of materials in the graphic user interface; and
receiving a second selection of the material from the plurality of materials displayed in the graphic user interface to minimize the first quantity of $CO_2$ emissions.

15. The system of claim 13, wherein the material is an alloy, and
wherein the estimating the first quantity of $CO_2$ emissions further comprises:
determining the first $CO_2$ emission factor for the alloy at a material level based on a second proportional composition of each constituent element in the alloy.

16. The system of claim 13, wherein the operations further comprise:
displaying a comparison of energy consumption across a set of manufacturing processes for manufacturing the product; and
receiving a second selection of selecting the manufacturing process from the set of manufacturing processes displayed in the graphic user interface to minimize the second quantity of $CO_2$ emissions.

17. The system of claim 13, wherein estimating the second quantity of $CO_2$ emissions further comprises:
determining the second quantity of $CO_2$ emissions by comparing $CO_2$ emissions for the manufacturing process across a set of jurisdictions; and
receiving a second selection via the graphic user interface of a jurisdiction from the set of jurisdictions to minimize the second quantity of $CO_2$ emissions.

18. The system of claim 13, further comprising:
displaying a plurality of properties of the material in the graphic user interface; and
receiving a second selection of the material based on product suitability of the plurality of properties.

19. The system of claim 13, wherein the amount of material consumed is determined through one or more of:
manual estimation of material utilization;
actual material utilization on a manufacturing shop floor; and
analysis from manufacturing simulation software.

20. A method comprising:
receiving a selection of a material from a graphic user interface;
displaying the selection in the graphic user interface;
calculating an amount of material and an amount of energy that are consumed when manufacturing a product according to a manufacturing process;
decomposing a chemical composition of the material into a set of constituent elements;
estimating a first quantity of carbon dioxide ($CO_2$) emissions based on the amount of material consumed and a first $CO_2$ emission factor, wherein the first $CO_2$ emission factor is based on a proportional composition of the set of constituent elements in the chemical composition;
estimating a second quantity of $CO_2$ emissions based on the amount of energy consumed and a second $CO_2$ emission factor, wherein the second $CO_2$ emission factor is based on an energy source used in the manufacturing process;
estimating a total $CO_2$ emission for the product based on both the first quantity of $CO_2$ emissions and the second quantity of $CO_2$ emissions; and
adjusting the manufacturing process based on the total $CO_2$ emissions for the product.

* * * * *